(12) United States Patent
Itabashi et al.

(10) Patent No.: US 8,238,778 B2
(45) Date of Patent: Aug. 7, 2012

(54) IMAGE FORMING APPARATUS WITH VIBRATION GENERATING SOURCE AND DAMPING MEMBER

(75) Inventors: Toshifumi Itabashi, Toride (JP); Taro Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1146 days.

(21) Appl. No.: 12/054,056

(22) Filed: Mar. 24, 2008

(65) Prior Publication Data
US 2008/0251337 A1    Oct. 16, 2008

(30) Foreign Application Priority Data
Apr. 12, 2007    (JP) .................................. 2007-105368

(51) Int. Cl.
*G03G 15/00* (2006.01)
(52) U.S. Cl. .......................................... 399/92; 399/107
(58) Field of Classification Search .................... 399/92, 399/107; 271/94, 90
See application file for complete search history.

(56) References Cited

U.S. PATENT DOCUMENTS

| | | | |
|---|---|---|---|
| 5,645,274 A | 7/1997 | Ubayashi et al. | ............... 271/94 |
| 7,075,686 B2 * | 7/2006 | Hayashi | ........................ 358/497 |
| 7,410,161 B2 * | 8/2008 | Yamamoto | .................... 271/124 |
| 2004/0208031 A1 * | 10/2004 | Miwa et al. | ................... 363/141 |
| 2007/0228639 A1 | 10/2007 | Matsumoto et al. | ............ 271/97 |
| 2007/0284805 A1 | 12/2007 | Ikeda | .............................. 271/11 |

FOREIGN PATENT DOCUMENTS

| | | |
|---|---|---|
| JP | 7-196187 A | 8/1995 |
| JP | 11-157678 A | 6/1999 |
| JP | 11-294535 A | 10/1999 |
| JP | 2000-129955 A | 5/2000 |

* cited by examiner

*Primary Examiner* — Sophia S Chen
(74) *Attorney, Agent, or Firm* — Fitzpatrick, Cella, Harper & Scinto

(57) ABSTRACT

An image forming apparatus has a vibration generating source, a holding member that holds the vibration generating source and a sealing member arranged between them. An elastic damping member is inserted in a through-hold formed in the holding member and is brought into pressure contact with the vibration generating source, the damping member having a retaining portion which is retained to a surface of the holding member on the side opposite to a holding surface of the vibration generating source and a main body portion that has a diameter smaller than a diameter of the through-hole so that it is inserted into the through-hole without contacting the through-hole and brought into pressure contact with the vibration generating source. There is also a fixing portion that integrally fixes the holding member and the vibration generating source through the damping member.

9 Claims, 8 Drawing Sheets

IMAGE FORMING APPARATUS WITH VIBRATION GENERATING SOURCE AND DAMPING MEMBER

BACKGROUND OF THE INVENTION

1. Field of the Invention

The present invention relates to an image forming apparatus and, more particularly, to a damping structure for preventing noises caused by a vibration of a vibration generating source.

2. Description of the Related Art

Hitherto, an image forming apparatus such as printer, copying apparatus, or the like has a sheet feeding apparatus for feeding sheets one by one from a sheet enclosing portion in which a plurality of sheets have been enclosed. As such a sheet feeding apparatus, there is an apparatus of an air sheet feeding system in which a plurality of sheets are floated by blowing air to an edge portion of a bundle of sheets enclosed in the sheet enclosing portion and only one sheet is adsorbed to an adsorption conveying belt arranged in an upper position and is conveyed. Such a technique has been disclosed in Japanese Patent Application Laid-Open No. H07-196187.

Such a sheet feeding apparatus of the air sheet feeding system has: a motor as a driving source of the adsorption conveying belt which is driven when feeding the sheet; and an axial-flow fan for blasting. Since those motor and fan execute the rotating operation, a vibration will occur upon operation so that the vibration changes to a sound.

Even if the motor and the fan do not generate noises in the operation of itself, when the motor and the fan (hereinbelow, referred to as a motor or the like) are attached to an apparatus main body, the vibration of the motor or the like vibrates a frame such as an attached sheet metal of the apparatus main body. When the frame vibrates as mentioned above, the noises are generated, and a disturbance of an image also occurs by the vibration of the frame when the image is formed.

To solve such a problem due to the vibration, therefore, in the sheet feeding apparatus in the related art, a damping member made of an elastic member such as rubber is interposed between a vibration generating source as a vibrating source such as a motor and a holding member to which the vibration generating source is fixed. In the case of fixing the vibration generating source to the holding member with a screw, the damping member is sandwiched in a fastening portion.

In the fastening portion where the vibration generating source is fixed to the holding member, the damping member is sandwiched between the vibration generating source and the holding member. If the damping member is sandwiched in this manner, the damping member is compressed. When the damping member is compressed, hardness of the damping member (elastic member) rises and the damping member enters a state where the vibration is liable to be propagated, so that the propagation of the vibration in the fastening portion increases.

FIG. 8 is a diagram illustrating an example of the damping structure of the vibration generating source in the related art. As illustrated in FIG. 8, a vibration generating source 3 as a vibrating source for generating a vibration of a fan, a driving motor, or the like is fixed to a holding member 2 such as a frame. In this state, a damping member 81 such as rubber is sandwiched between the vibration generating source 3 and the holding member 2 by an attaching screw 4 and a fastening portion 82 provided for the holding member 2.

If the vibration generating source 3 is the fan, one of an air inlet and an air outlet is provided on the holding member side. If the air inlet is provided in this manner, in order to assure an air duct between the fan and the holding member 2, a sealing member 7 having elasticity is arranged between the vibration generating source 3 and the holding member 2 as illustrated in FIG. 8.

However, since the damping member 81 enters a compressed state since it is sandwiched, in a state where the vibration generating source 3 has been fixed, hardness of the damping member 81 rises and the vibration of the vibration generating source 3 is liable to be propagated. A vibration propagating path according to such a fixing method is constructed in order of the vibration generating source 3→the damping member 81→the holding member 2, and a distance of the vibration propagating path in this case is equal to "a".

FIG. 9 is a diagram illustrating another example of a damping structure in the related art. According to this damping structure, after a damping member 83 was inserted into a through-hole 85 formed in the holding member 2, the vibration generating source 3 is brought into pressure contact with the holding member 2 through the sealing member 7 and fixed thereto by the attaching screw (bolt) 4 and a fastening portion (nut) 84 provided for the damping member 83. When the damping member 83 is brought into pressure contact with the vibration generating source 3 in this manner, the damping member 83 is elastically deformed and is brought into contact with both of the front and back surfaces of the holding member 2 and the inner wall surface of the through-hole 85. According to such a damping structure, the vibration generating source 3 is fixed so as to sandwich the damping member 83 between the vibration generating source 3 and the holding member 2 while being compressed. Therefore, a vibration propagating path is constructed in order of the vibration generating source 3→the damping member 83→the holding member 2. Thus, a distance of such a vibration propagating path is also equal to a and such a is substantially the same as the damping structure illustrated in FIG. 8.

In the image forming apparatus in which the vibration generating source has been fixed by the damping structure in the related art as mentioned above, if the suppression of the vibration propagation is insufficient, a countermeasure for thickening the damping member is taken, for example.

If the vibration generating source is the motor, since a member to be driven by the motor is generally provided for the holding member on the side opposite to the motor, a motor shaft for propagating a driving force of the motor is arranged so as to be extended to the left in FIGS. 8 and 9. Therefore, if the damping member is thickened, it is necessary to extend a length of motor shaft. However, if the length of motor shaft is extended, an influence of the eccentricity of the shaft is exerted on the motor by an extended amount of the motor shaft, so that an inconvenience is liable to occur in vibration propagating efficiency.

If the vibration generating source is the fan, the sealing member is used in order to assure the air duct between the vibration generating source and the holding member. In this case, if the damping member is thickened, a distance between the fan and the holding member increases by a thick amount of the damping member in association with it. It is necessary to thickening (enlarging) the sealing member. When the distance between the fan and the holding member further increases, a sealing area is widened, and it becomes difficult to assure a sealing degree. Thus, a possibility of an air intake/exhaust loss increases and intake or exhaust efficiency deteriorates.

SUMMARY OF THE INVENTION

The invention is, therefore, made in consideration of such a present situation and it is an object of the invention to provide an image forming apparatus in which the generation of noises due to a vibration of a vibration generating source can be reduced without thickening a damping member.

According to the invention, there is provided an image forming apparatus having an image forming portion for forming an image onto a sheet, comprising: a vibration generating source; a holding member that holds the vibration generating source; a damping member made of an elastic member which is inserted in a through-hole formed in the holding member and is brought into pressure contact with the vibration generating source; and a fixing portion which integrally fixes the holding member, the damping member, and the vibration generating source, wherein the damping member has a retaining portion which is retained to a surface of the holding member on the side opposite to a holding surface of the vibration generating source and a main body portion which is inserted in the through-hole formed in the holding member, is brought into pressure contact with the vibration generating source, and has a diameter smaller than a diameter of the through-hole.

Further features of the present invention will become apparent from the following description of exemplary embodiments with reference to the attached drawings.

DESCRIPTION OF THE EMBODIMENTS

An exemplary embodiment for embodying the invention will be described in detail hereinbelow with reference to the drawings.

Figure 1:
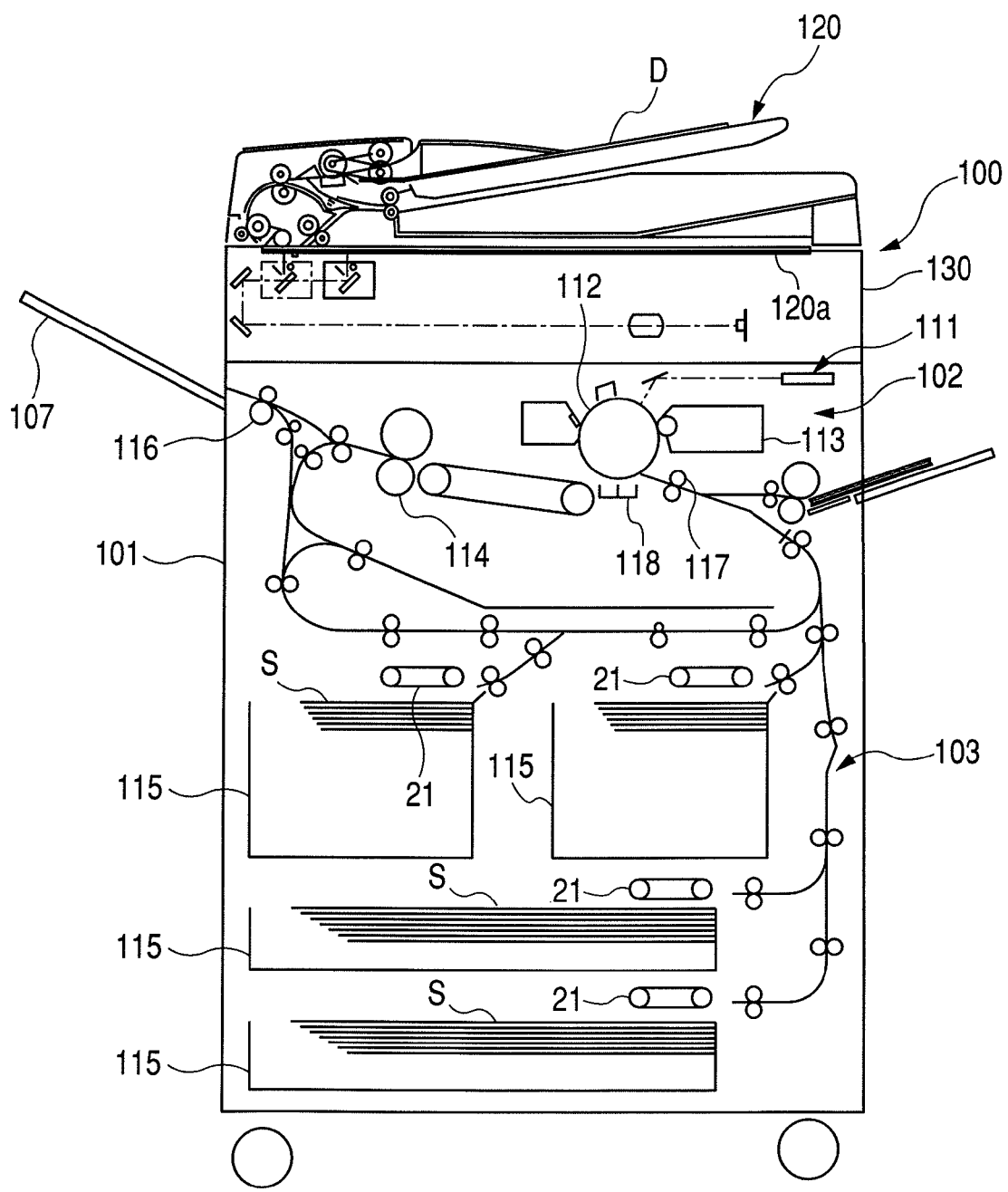
FIG. 1 is a diagram illustrating a schematic construction of a printer as an example of an image forming apparatus having a sheet feeding apparatus according to the first embodiment of the invention.

FIG. 1 is a diagram illustrating a schematic construction of a printer 100 as an example of an image forming apparatus having a sheet feeding apparatus according to the first embodiment of the invention.

In FIG. 1, an image reading portion 130 for reading an original document D put on platen glass 120a serving as an original setting plate is provided over a printer main body 101. An automatic document feeder (ADF) 120 for automatically conveying the original onto the platen glass 120a is arranged over the image reading portion 130.

An image forming portion 102 and a sheet feeding apparatus 103 for feeding a sheet S to the image forming portion 102 are provided in the printer main body 101.

The image forming portion 102 is provided with a photosensitive drum 112, a developing unit 113, and a laser scanner unit 111. The sheet feeding apparatus 103 has: a plurality of sheet enclosing portions 115 each of which encloses the sheets S and is detachable from the printer main body 101; and adsorption conveying belts each for conveying the sheets enclosed in the sheet enclosing portion 115.

The image forming operation of the printer 100 will now be described.

When an image reading signal is output to the image reading portion 130 from a control unit (not shown) provided for the printer main body 101, an image is read by the image reading portion 130. After that, a laser beam corresponding to an electric signal of the read image is irradiated from the laser scanner unit 111 onto the photosensitive drum 112.

At this time, the photosensitive drum 112 has previously been charged. By irradiating the light, an electrostatic latent image is formed onto the photosensitive drum 112. Subsequently, by developing the electrostatic latent image by the developing unit 113, a toner image is formed on the photosensitive drum.

When a sheet feeding signal is output from the control unit to the sheet feeding apparatus 103, the sheet S is fed out of the sheet enclosing portion 115. The fed sheet S is sent to a transfer portion constructed by the photosensitive drum 112 and a transfer charging unit 118 so as to be synchronized with the toner image on the photosensitive drum 112 by a registration roller 117.

Subsequently, the toner image is transferred onto the sheet fed to the transfer portion in this manner and, thereafter, the sheet is conveyed to a fixing portion 114. Further after that, the toner image is heated and pressurized by the fixing portion 114, so that a non-fixed transfer image is permanently fixed onto the sheet S. The sheet on which the image has been fixed in this manner is discharged from the printer main body 101 onto a sheet discharge tray 107 by an ejecting roller 116.

Figure 2:
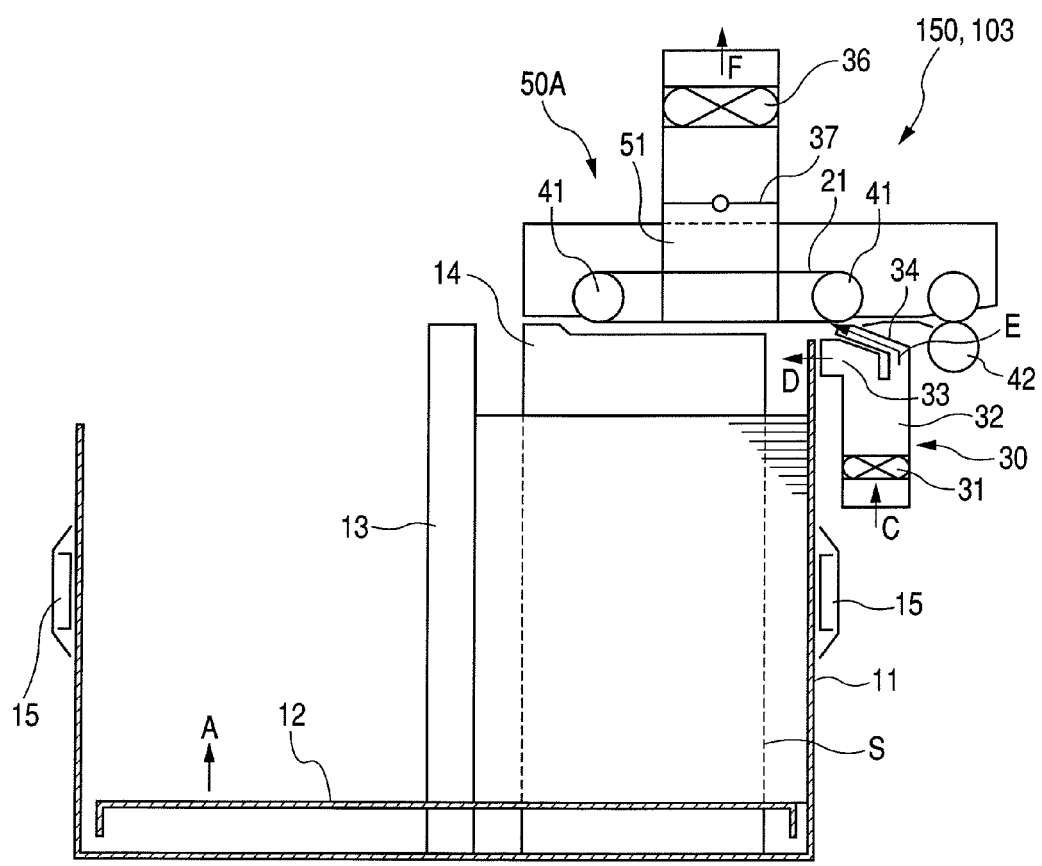
FIG. 2 is a diagram illustrating a construction of the sheet feeding apparatus.

FIG. 2 is a diagram illustrating a construction of the sheet feeding apparatus 103. A sheet enclosing box 11 has: a tray 12 serving as a sheet stacking portion; a rear edge restricting plate 13 for restricting an upstream side (rear side) of the sheet S in the sheet feeding direction; and a side edge restricting plate 14 for restricting a position of the sheet S in the width direction which perpendicularly crosses the sheet feeding direction. The rear edge restricting plate 13 and the side edge restricting plate 14 are constructed so that the position can be arbitrarily changed according to a size of sheet enclosed. The sheet enclosing box 11 can be pulled out of the printer main body 101 by slide rails 15.

Further, a sheet feeding mechanism of an air sheet feeding system (hereinbelow, referred to as an air sheet feeding mechanism 150) for separating and feeding the sheets one by one is provided over the sheet enclosing box 11. The air sheet feeding mechanism 150 has: an adsorption conveying portion 50A for adsorbing and conveying a top one of the sheets S stacked on the tray 12; and an air blowing portion 30 for floating an upper portion of the bundle of sheets on the tray and separating the sheets S one by one.

The adsorption conveying portion 50A has: the adsorption conveying belt 21 which is suspended between belt driving rollers 41 and is used to adsorb and convey the sheet S to the right in the diagram; and an adsorbing fan 36 for generating a negative pressure for allowing the sheet S to be adsorbed onto the adsorption conveying belt 21. The adsorption conveying portion 50A also has a sucking duct 51 which is arranged inside of the adsorption conveying belt 21 and is used to suck air through a sucking hole (not shown) formed in the adsorption conveying belt 21.

Further, the adsorption conveying portion 50A has an adsorbing shutter 37 which is arranged between the adsorbing fan 36 and the sucking duct 51 and is used to turn on/off the adsorbing operation of the adsorption conveying belt 21. In the embodiment, a plurality of adsorption conveying belts 21 is arranged at regular intervals.

The air blowing portion 30 has: a loosening nozzle 33 and a separating nozzle 34 for blowing the air to an upper portion of the enclosed sheets S; a separating fan 31; and a separating duct 32 for feeding the air from the separating fan 31 to each of the nozzles 33 and 34.

The air sucked in the direction shown by an arrow C by the separating fan 31 passes through the separating duct 32 and is blown in the direction shown by an arrow D by the loosening nozzle 33, thereby floating several upper ones of the sheets S stacked on the tray 12. The air is blown in the direction shown by an arrow E by the separating nozzle 34 and separates the sheets, one by one, which have been floated by the loosening nozzle 33, thereby allowing the separated sheets to be adsorbed onto the adsorption conveying belt 21.

Subsequently, the sheet feeding operation of the sheet feeding apparatus 103 (air sheet feeding mechanism 150) constructed as mentioned above will be described.

First, when the user pulls out the sheet enclosing box 11, sets the sheets S, and thereafter, encloses the box 11 to a predetermined position as illustrated in FIG. 2, the tray 12 starts to ascend in the direction shown by an arrow A. When the upper surface of the sheets on the tray soon reaches a feeding-possible position where the sheet can be conveyed by the adsorption conveying belt 21, the tray 12 is stopped at this position.

Subsequently, when the sheet feeding signal is detected, the control unit (not shown) makes the separating fan 31 operative so as to suck the air in the direction of the arrow C. The air is blown to the sheet bundle from the loosening nozzle 33 and the separating nozzle 34 in the directions of the arrows D and E through the separating duct 32. Thus, the several upper sheets of the sheet bundle are floated. The control unit makes the adsorbing fan 36 operative so as to blow out the air in the direction shown by an arrow F. At this time, the adsorbing shutter 37 is still closed.

Subsequently, when a predetermined time elapses after the detection of the sheet feeding signal and the floating of the upper sheets becomes stable, the control unit rotates and opens the adsorbing shutter 37, thereby allowing a sucking force to be generated from the sucking hole formed in the adsorption conveying belt 21. Only the top one of the sheets S stacked on the tray 12 is adsorbed to the adsorption conveying belt 21 by such an adsorbing force and the separation air from the separating nozzle 34.

Subsequently, the control unit allows the belt driving rollers 41 to be rotated. Thus, the top sheet is fed in a state where it has been adsorbed to the adsorption conveying belt 21 and, thereafter, sent toward the image forming portion by a pair of drawing rollers 42.

Figure 3:
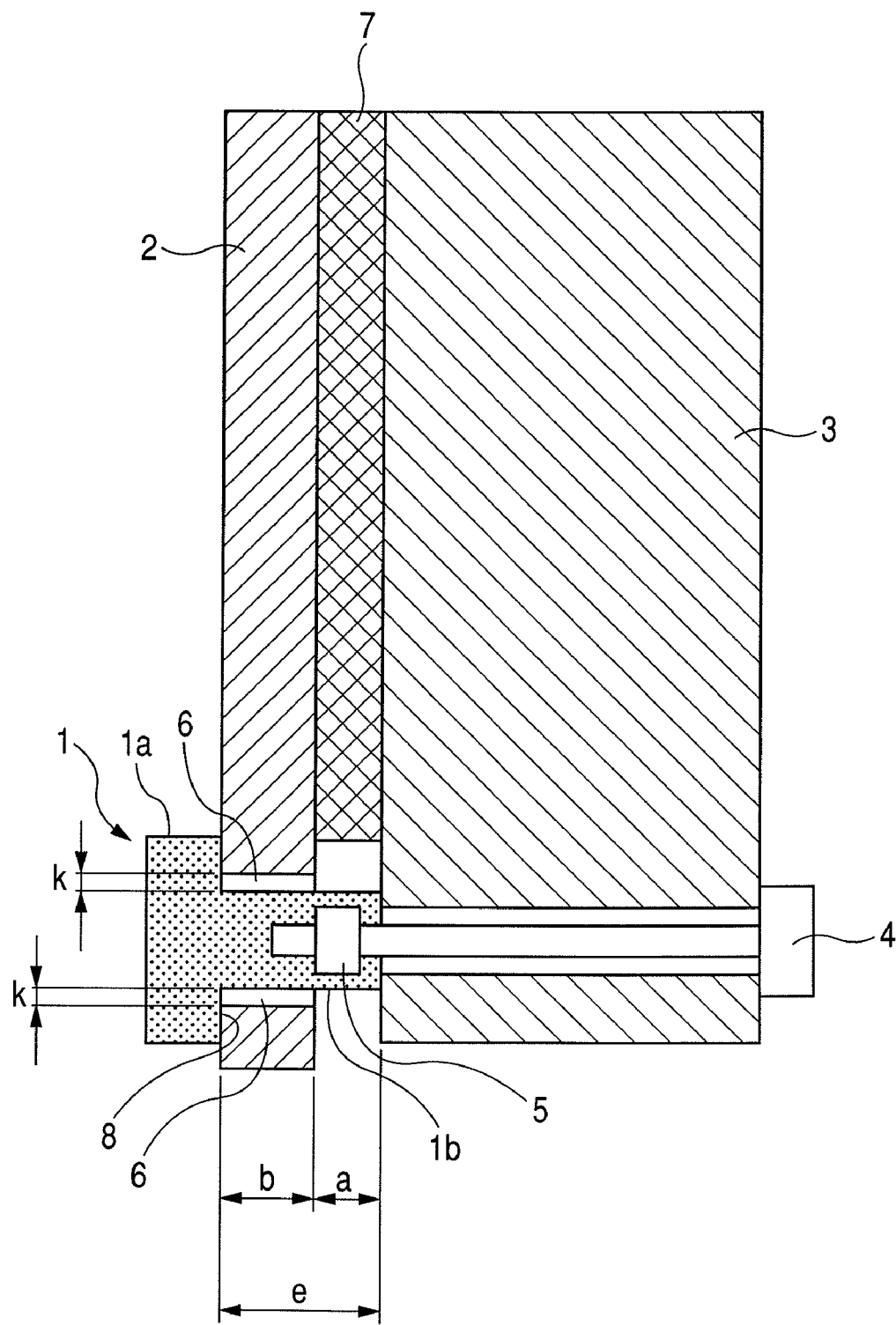
FIG. 3 is a diagram for describing a construction of a damping structure of a separating fan, an adsorbing fan, and the like of the sheet feeding apparatus.
Figure 4:
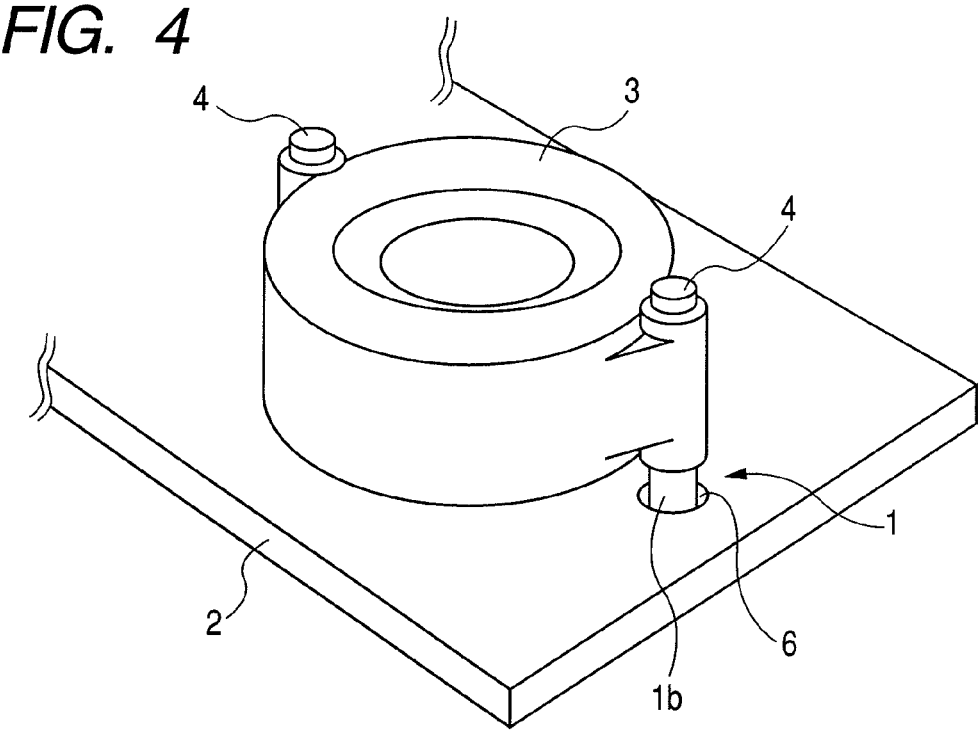
FIG. 4 is a first perspective view for describing the construction of the damping structure.
Figure 5:
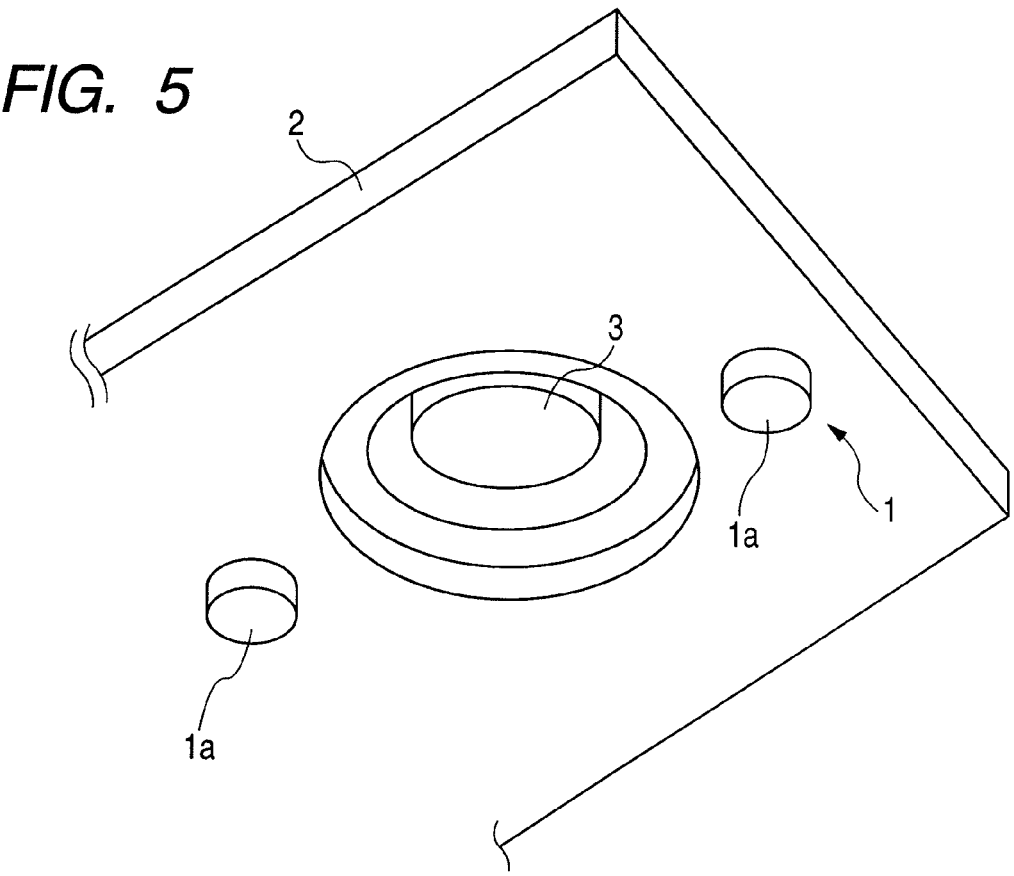
FIG. 5 is a second perspective view for describing the construction of the damping structure.

A construction of a damping structure of the separating fan 31 and the adsorbing fan 36 according to the embodiment will now be described with reference to FIGS. 3 to 5. In FIGS. 3 to 5, the same or similar portions as those in FIGS. 8 and 9 mentioned above are designated by the same reference numerals.

In FIGS. 3, 4, and 5, a damping member 1 is made of an elastic member such as rubber. The damping member 1 is arranged between the vibration generating source 3 for generating a vibration at the time of the operation of, for example, the separating fan 31, the adsorbing fan 36, and the holding member 2 such as a frame on the side of the printer main body which fixes the vibration generating source 3. The holding member 2 is made of, for example, a metal or a mold and has a through-hole 6 in which the damping member 1 is inserted.

In the embodiment, a retaining portion 1a is provided at one end of the damping member 1. The retaining portion 1a is retained to a retaining surface 8 constructed by the surface of the holding member 2 on the side opposite to the holding surface of the vibration generating source 3. A main body portion 1b of the damping member is inserted in the through-hole 6 formed in the holding member 2. When fixing the vibration generating source 3, the main body portion 1b is brought into pressure contact with the vibration generating source 3 while being elastically deformed.

A fastening portion 5 is constructed by a nut or the like integrally attached to the damping member 1. A fixing portion is constructed by the fastening portion 5 and the attaching screw (bolt) 4 and integrally fixes the holding member 2, damping member 1, and vibration generating source 3. Although the embodiment has been described with respect to the case where the nut is used as a fastening portion 5, another construction in which a tap is formed to the damping member 1 and integrated therewith may be used so long as the damping member 1 can be fixed with the attaching screw 4.

When the vibration generating source 3 is fixed to the holding member 2, first, the damping member 1 is inserted in the through-hole 6 formed in the holding member 2. Subsequently, the attaching screw 4 is fastened to the fastening portion 5 of the damping member 1. Thus, the retaining portion 1a of the damping member 1 is pressed to the retaining surface 8 of the holding member 2 on the side opposite to the vibration generating source 3 and the damping member 1 is retained in a state where it is in contact with the damping member 1 by a plane.

In the embodiment, a diameter of the main body portion 1b of the holding member 2 (piercing portion) which is inserted in the through-hole 6 is smaller than a diameter of the inner wall surface of the through-hole 6 of the holding member 2. Therefore, the damping member 1 is inserted in the through-hole 6 without being brought into contact therewith and a gap k is formed between the damping member 1 and the through-hole 6. Consequently, the damping member 1 is brought into contact with the holding member 2 only by the surface 8 of the holding member 2 on the side opposite to the vibration generating source 3.

For example, an air inlet of the separating duct 32 illustrated in FIG. 2 is provided on the printer main body side and an air inlet (not shown) is also similarly provided for the holding member 2. The sealing member 7 having the elasticity is arranged at the position of the air inlet in order to assure sealing performance of an intake passage and to assure intake performance.

The sealing member 7 is arranged between the vibration generating source 3 and the holding member 2 so as to be closely adhered to the vibration generating source 3 and the holding member 2. The sealing member 7 can be arranged so as to be associated with either the vibration generating source 3 or the holding member 2 or may be provided as another member.

In the embodiment, as mentioned above, the damping member 1 is in contact with the holding member 2 only by the retaining surface 8 of the holding member 2 on the side opposite to the vibration generating source 3. In this case, the vibration propagating path from the vibration generating source 3 is constructed in order of the vibration generating source 3→the damping member 1→the holding member 2.

When the distance between the vibration generating source 3 and the holding member 2 is assumed to be a, a length of through-hole 6 of the holding member 2 (=a distance from the surface of the holding member 2 to the retaining surface 8 of the holding member 2 on the side opposite to the vibration generating source 3) is assumed to be b, and a distance of the vibration propagating path is assumed to be e, the vibration propagating path distance e is calculated as follows.

$$e=a+b$$

Figure 8:
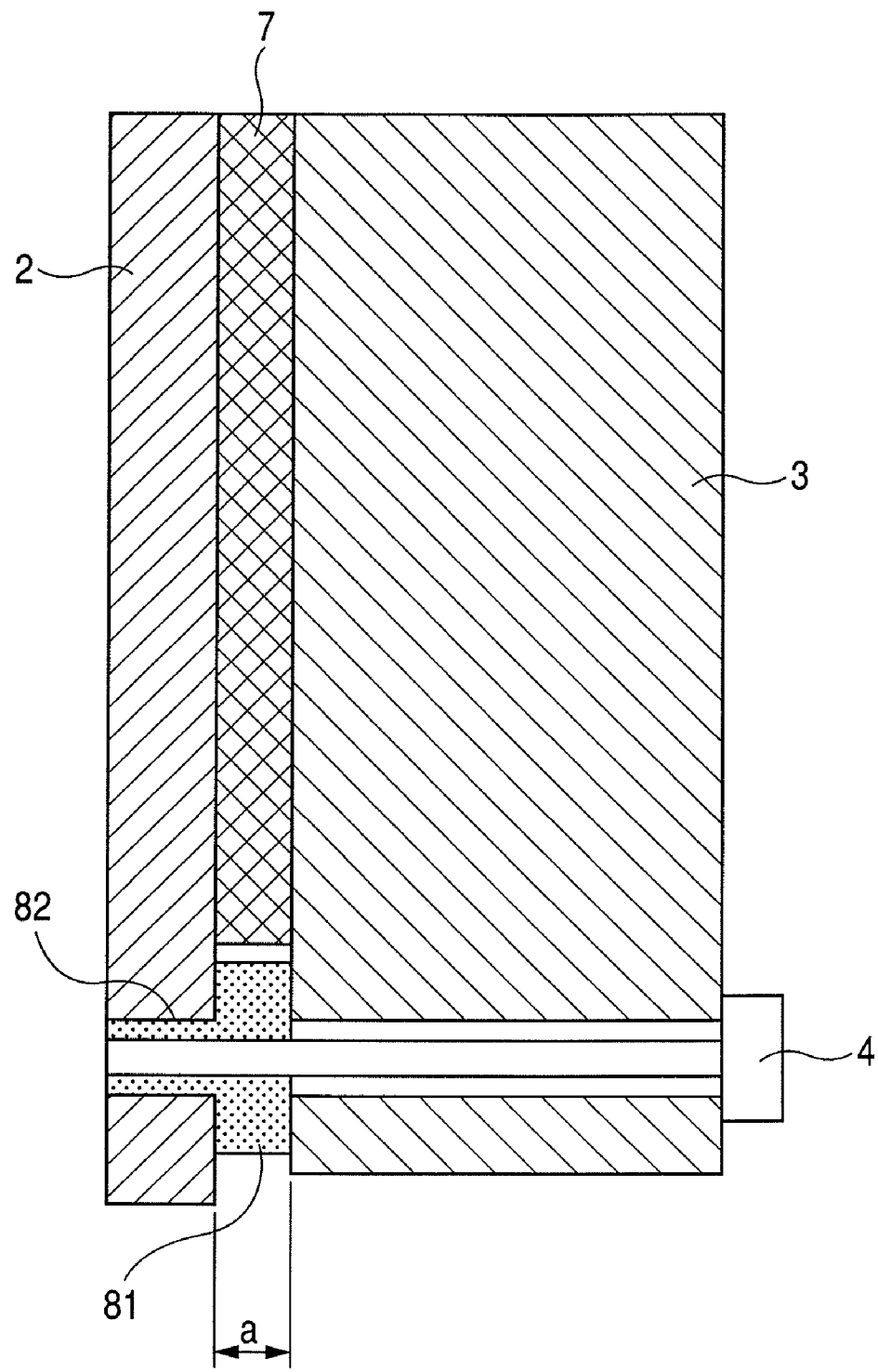
FIG. 8 is a diagram illustrating an example of a damping structure of a vibration generating source of a sheet feeding apparatus in the related art.
Figure 9:
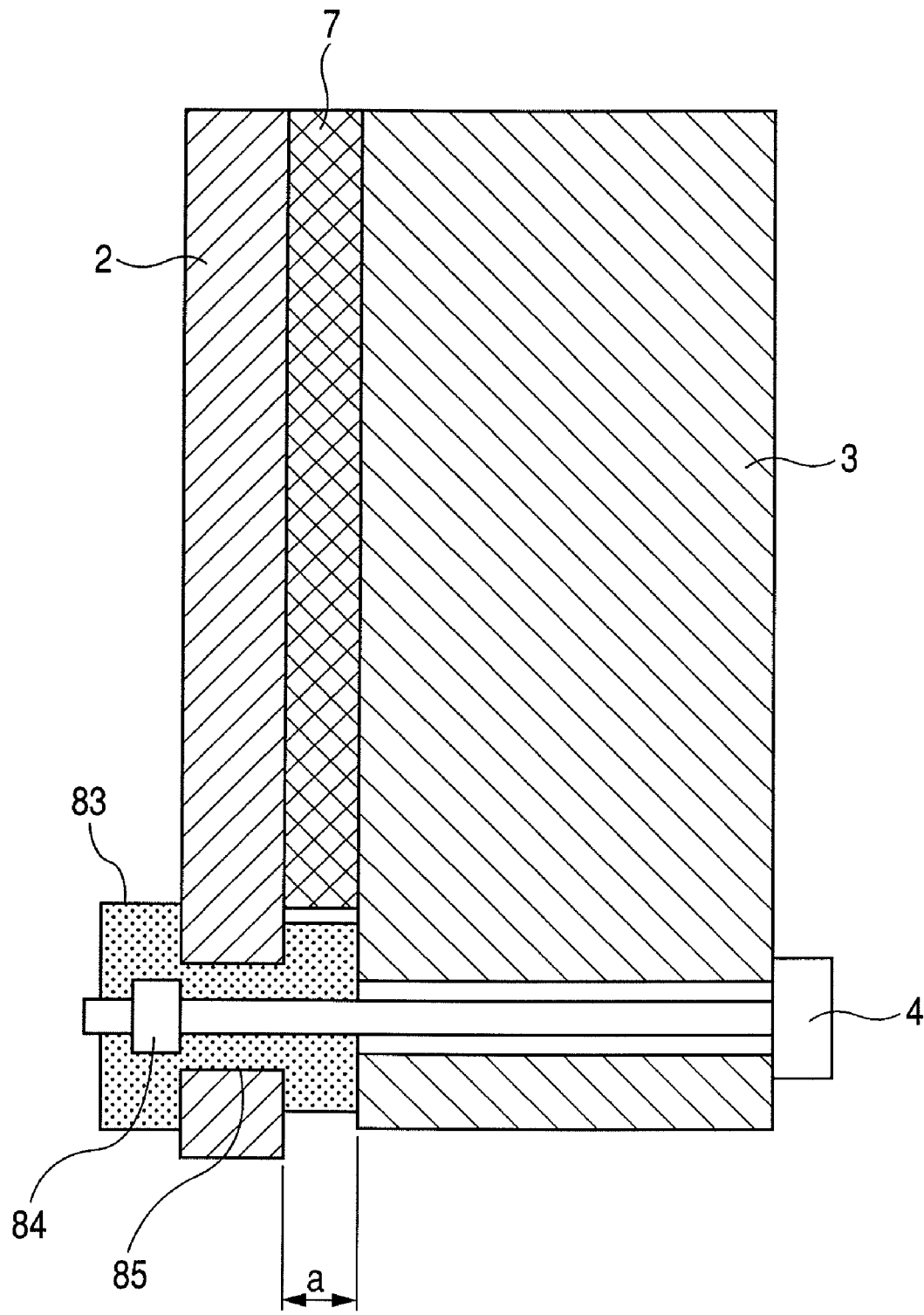
FIG. 9 is a diagram illustrating an example of another damping structure of the vibration generating source of the sheet feeding apparatus in the related art

When comparing the vibration propagating path distance e with the vibration propagating path distance a according to the fixing method in the related art illustrated in FIGS. 8 and 9 which has already been mentioned, the vibration propagating path distance e in the embodiment is longer than the vibration propagating path distance in the related art by the length b.

Even if the damping member 1 is fixed and the hardness is raised, a vibration absorbing region of the damping member 1 can be enlarged by an amount corresponding to the extended value b of the vibration propagating path distance. Thus, vibration absorbing performance can be improved without changing the distance between the vibration generating source 3 and the holding member 2 from the distance in the related art. An inconvenience occurring due to the vibration such as noises can be lightened.

That is, the damping member 1 is retained to the retaining surface 8 of the holding member 2 on the side opposite to the vibration generating source 3, is inserted in the through-hole 6 without being brought into contact with the through-hole 6 of the holding member 2, and is brought into pressure contact with the vibration generating source 3 without being brought into contact with the through-hole 6, thereby enabling the vibration propagating path distance to be extended. Thus, the generation of the noises due to the vibration of the vibration generating source 3 can be reduced without thickening the damping member 1.

The second embodiment of the invention will now be described.

Figure 6:
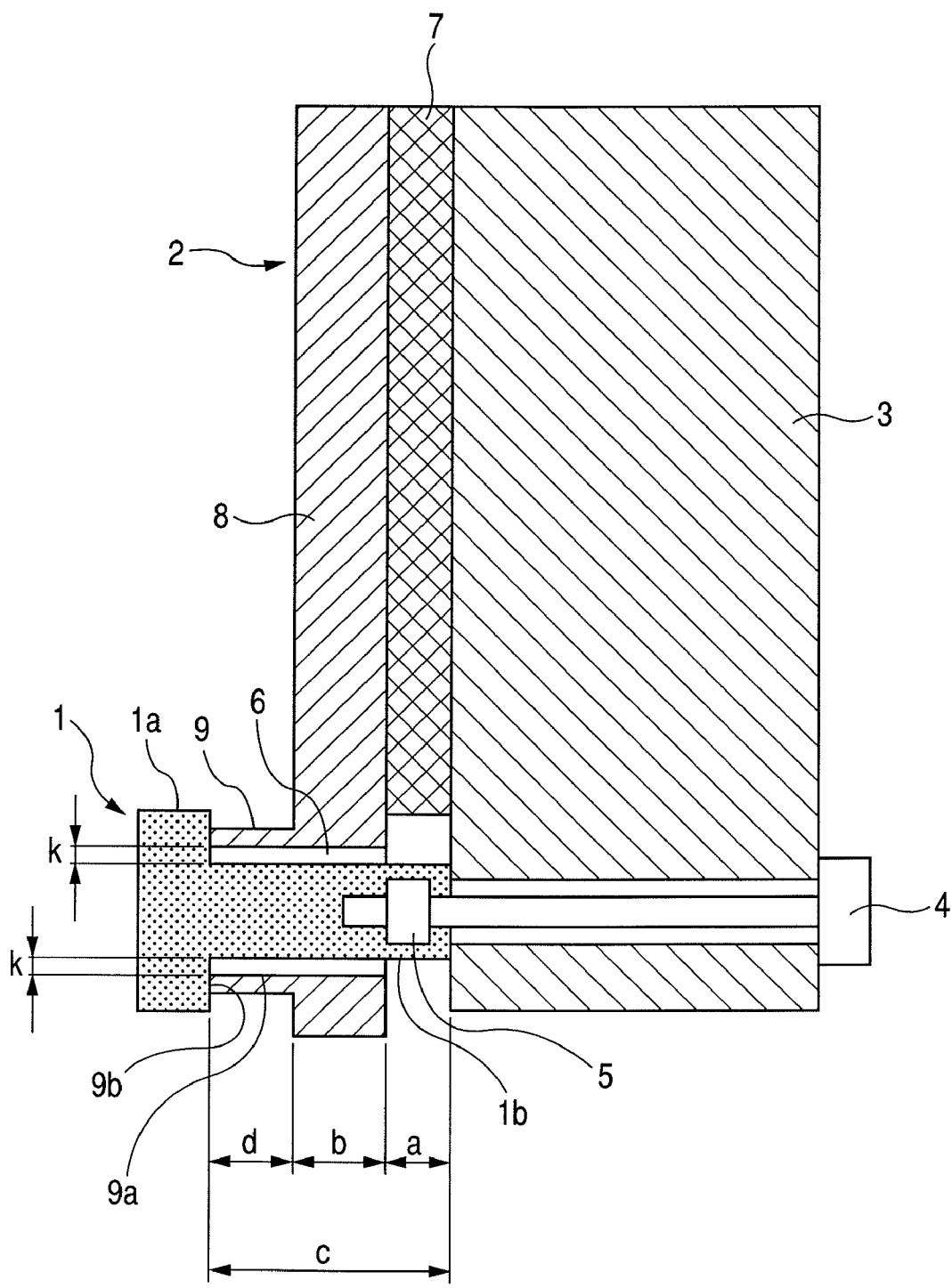
FIG. 6 is a diagram for describing a construction of a damping structure of a sheet feeding apparatus according to the second embodiment of the invention.

FIG. 6 is a diagram illustrating a construction of a damping structure of the vibration generating source 3 such as separating fan 31, adsorbing fan 36, and the like provided for a sheet feeding apparatus according to the second embodiment. In FIG. 6, the same or similar portions as those in FIG. 3 mentioned above are designated by the same reference numerals.

In FIG. 6, a projecting portion 9 is formed on the retaining surface 8 of the holding member 2 on the side opposite to the vibration generating source 3 so as to be projected from the retaining surface 8. The projecting portion 9 is formed by executing an extrusion to the holding member 2. A through-hole 9a communicated with the through-hole 6 into which the damping member 1 is inserted is formed in the projecting portion 9. When fixing the vibration generating source 3 to the holding member 2, the damping member 1 is inserted into both of the through-hole 6 formed in the holding member 2 and the through-hole 9a formed in the projecting portion 9. Subsequently, by fastening the attaching screw 4 to the fastening portion 5 of the damping member 1, the retaining portion 1a is pressed to the projecting portion 9 of the holding member 2 and the damping member 1 is retained in a state where it is in contact with a front edge surface 9b of the projecting portion 9 by a plane.

A diameter of the main body portion 1b of the damping member 1 is smaller than a diameter of the inner wall surface of each of the through-hole 6 of the holding member 2 and the through-hole 9a of the projecting portion 9 of the holding member 2. Thus, the damping member 1 is inserted into the through-holes 6 and 9a of the holding member 2 and the projecting portion 9 without being brought into contact with those through-holes. The gap k is formed between the damping member 1 and each of the through-holes 6 and 9a. Consequently, the damping member 1 is brought into contact with the holding member 2 only by the front edge surface 9b of the projecting portion 9. By retaining the damping member 1 to the front edge surface 9b of the projecting portion 9 of the holding member 2, the vibration propagating path from the vibration generating source 3 is constructed in order of the vibration generating source 3→the damping member 1→the projecting portion 9 of the holding member 2. When the distance between the vibration generating source 3 and the holding member 2 is assumed to be a, a length of through-holes 6 and 9a including the projecting portion 9 of the holding member 2 (=a distance from the surface of the holding member 2 on the side of the vibration generating source to the front edge surface 9b of the projecting portion 9) is assumed to be b+d, and the distance of the vibration propagating path is assumed to be c, the vibration propagating path distance c is calculated as follows.

$$c=a+b+d$$

When comparing the vibration propagating path distance c with the vibration propagating path distance a according to the fixing method in the related art illustrated in FIGS. 8 and 9 which has already been mentioned, the vibration propagating path distance c in the embodiment is longer than the vibration propagating path distance a in the related art by the length b+d.

Even if the damping member 1 is fixed and the hardness is raised, the vibration absorbing region of the damping member 1 can be enlarged by an amount corresponding to the extended value b+d of the vibration propagating path distance. Thus, the generation of the noises due to the vibration of the vibration generating source 3 can be reduced without thickening the damping member 1.

The third embodiment of the invention will now be described.

Figure 7:
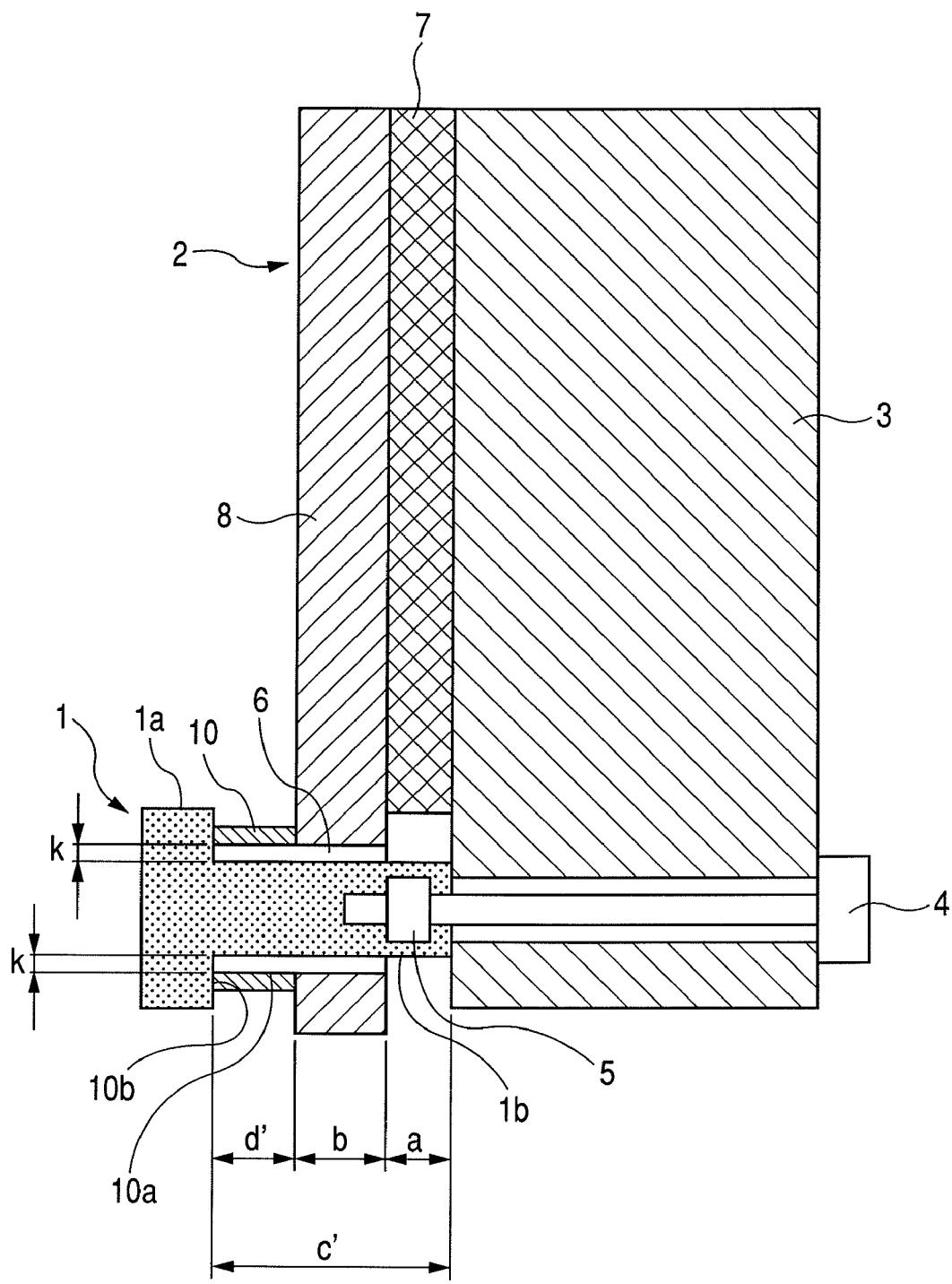
FIG. 7 is a diagram for describing a construction of a damping structure of a sheet feeding apparatus according to the third embodiment of the invention.

FIG. 7 is a diagram illustrating a construction of a damping structure of the vibration generating source such as separating fan 31, adsorbing fan 36, and the like provided for a sheet feeding apparatus according to the third embodiment. In FIG. 7, the same or similar portions as those in FIG. 3 are designated by the same reference numerals.

In FIG. 7, a cylindrical member 10 is a projecting member which is exchangeably provided for the holding member 2 on the side opposite to the vibration generating source 3. The cylindrical member 10 is attached so as to be sandwiched between the damping member 1 and the retaining surface 8 of the holding member 2 on the side opposite to the vibration generating source 3. A through-hole 10a communicated with the through-hole 6 into which the damping member 1 is inserted is formed in the cylindrical member 10.

When fixing the vibration generating source 3 to the holding member 2, the damping member 1 is inserted into both of the through-hole 6 formed in the holding member 2 and the through-hole 10a formed in the cylindrical member 10. Subsequently, by fastening the attaching screw 4 to the fastening portion 5 of the damping member 1, the retaining portion 1a is pressed to the cylindrical member 10, so that the damping member 1 is retained in a state where it is in contact with a surface 10b of the cylindrical member 10 on the side opposite to the vibration generating source 3 by a plane.

A diameter of the main body portion 1b of the damping member 1 is smaller than the diameter of the through-hole 6 of the holding member 2 and a diameter of the through-hole 10a of the cylindrical member 10. Thus, the damping member 1 is inserted into the through-holes 6 and 10a of the holding member 2 and the cylindrical member 10 without being brought into contact with those through-holes. The gap k is formed between the damping member 1 and each of the through-holes 6 and 10a. Consequently, the damping member 1 is brought into contact with the holding member 2 only by the front edge surface 10b of the cylindrical member 10.

By retaining the damping member 1 to the front edge surface 10b of the cylindrical member 10, the vibration propagating path from the vibration generating source 3 is constructed in order of the vibration generating source 3→the damping member 1→the cylindrical member 10.

When the distance between the vibration generating source 3 and the holding member 2 is assumed to be a, a length of through-holes 6 and 10a including the holding member 2 and the cylindrical member 10 (=a distance from the surface of the holding member 2 on the side of the vibration generating source to the front edge surface 10b of the cylindrical member 10) is assumed to be b+d', and the distance of the vibration propagating path is assumed to be c', the vibration propagating path distance c' is calculated as follows.

$$c'=a+b+d'$$

When comparing the vibration propagating path distance c' with the vibration propagating path distance a according to the fixing method in the related art, the vibration propagating path distance c' in the embodiment is longer than the vibration propagating path distance a in the related art by the length b+d' of through-holes 6 and 10a including the holding member 2 and the cylindrical member 10.

Even if the damping member 1 is fixed and the hardness is raised, the vibration absorbing region of the damping member 1 can be enlarged by an amount corresponding to the extended value b+d' of the vibration propagating path distance. Thus, the generation of the noises due to the vibration of the vibration generating source 3 can be reduced without thickening the damping member 1.

By exchangeably providing the cylindrical member 10 as shown in the embodiment, the cylindrical member 10 of a different length can be used and the distance d' can be changed to an arbitrary length as necessary.

For example, in order to change vibration absorbing characteristics according to the case where the vibration generating source 3 is changed or the case where a rotational speed of the motor or the fan that becomes a cause of generation of the vibration is changed and an oscillating frequency is changed, it is necessary to change the vibration absorbing region. In such a case, the cylindrical member 10 can be changed to a cylindrical member of a different length and the distance d' can be changed.

By changing a modulus of elasticity of the cylindrical member 10, the vibration propagating path distance can be further extended. For example, if the cylindrical member 10 is replaced by a cylindrical member having a modulus of elasticity softer than the holding member 2, the distance d' of the cylindrical member 10 is added to the vibration propagating path. The vibration propagating path from the vibration generating source 3 is constructed in order of the vibration generating source 3→the damping member 1→the cylindrical member 10→the holding member 2. When a vibration propagating path distance is assumed to be f, the vibration propagating path distance f is calculated as follows.

$$f=c'+d'$$

When presuming a case where the distance d in the second embodiment mentioned above and the distance d' in the third embodiment are equal (d=d'), c=c' is obtained. Therefore, the vibration propagating path distance f in the third embodiment is larger than the vibration propagating path distance c in the second embodiment by the increased amount of the distance d as shown by the following equation.

$$f=c+d$$

The vibration absorbing region can be enlarged by the amount of the distance d. Thus, the vibration absorbing performance can be improved and the inconvenience such as noises occurring due to the vibration can be lightened without changing the distance between the vibration generating source 3 and the holding member 2 from the distance in the related art.

Although the vibration generating source 3 is assumed to be the fan in the above description, the invention is not limited to such an example. The vibration generating source may be another vibration generating source such as a driving motor or the like as a vibration generating source of the adsorption conveying belt 21 as a driving portion which is driven when feeding the sheet.

Although the above description has been made on the assumption that the fixing portion is brought into engagement with the portion of the main body portion 1b of the damping member 1 on the side of the vibration generating source from the retaining portion 1a, the damping member 1 is stretched to the fan (vibration generating source) side, and the damping member 1 is brought into pressure contact and fixed to the vibration generating source 3. In the case of constructing as mentioned above, as compared with the case where the damping member 1 is compressed between the holding member 2 and the vibration generating source 3 like a related art, the increase in hardness can be prevented. Thus, the vibration propagation can be made difficult to occur.

Advantages of the invention will be described hereinbelow by comparing, for example, the noises generated in the damping structure according to the third embodiment and those in the related art illustrated in FIG. 9 mentioned above.

In the comparison, the object to be measured is assumed to be the fan such as separating fan 31, adsorbing fan 36. An integration type noise meter is used for the measurement and an equivalent noise level for ten seconds is measured in a dynamic characteristics Fast mode.

A position of the noise meter is set to a position away from the fan at a predetermined distance. The fan is stationarily operated at a rotational speed at the time of use of the embodiment. The comparison is made under the same conditions. A common constructional portion of the related art and the second embodiment relates to the fan, the sealing member (a fundamental thickness is set to about 4 mm), and the holding member (a material is made of a metal and a fundamental thickness is equal to about 1 mm), and a fastening force of the damping member and the fastening screw is set to about 0.6 N·m.

As a construction peculiar to the related art, the damping member (a material is made of rubber and a diameter of the main body portion is equal to about 9 mm) is compressed and fixed to the fan and the holding member surface at a fastening force of 0.6 N·m. A diameter of through-hole of the holding member is set to about 9 mm so that the damping member can be inserted.

As a construction peculiar to the third embodiment, the cylindrical member (a material is made of a metal, a height is equal to about 7 mm, and a diameter of through-hole is equal to about 10 mm) is provided. The damping member (a material is made of rubber and a diameter of the main body portion is equal to about 9 mm) is retained to the edge surface of the cylindrical member at the fastening force of 0.6 N·m mentioned above and stretched and fixed to the fan side.

The comparison is made under such conditions. As a result of the comparison, according to the damping structure in the embodiment, the equivalent noise level is equal to about 3.2 db and is a lower value as compared with that in the related art. Therefore, it could be confirmed that the invention has a noise reducing advantage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-105368, filed Apr. 12, 2007 which is hereby incorporated by reference herein in its entirety.

What is claimed is:

1. An image forming apparatus having an image forming portion for forming an image onto a sheet, comprising:
   a vibration generating source;
   a holding member that holds the vibration generating source;
   a sealing member arranged between the vibration generating source and the holding member;
   a damping member made of an elastic member which is inserted in a through-hole formed in the holding member and is brought into pressure contact with the vibration generating source, the damping member having a retaining portion which is retained to a surface of the holding member on the side opposite to a holding surface of the vibration generating source and a main body portion which is inserted into the through-hole without contacting with the through-hole, is brought into pressure contact with the vibration generating source, and has a diameter smaller than a diameter of the through-hole so as not to contact the holding member; and
   a fixing portion that integrally fixes the holding member and the vibration generating source through the damping member.

2. An apparatus according to claim 1, wherein a projecting portion having a through-hole communicated with the through-hole of the holding member is formed on the surface of the holding member on the side opposite to the holding surface of the vibration generating source so as to be integrated with the holding member, thereby retaining the retaining portion of the damping member to the projecting portion.

3. An apparatus according to claim 2, wherein the diameter of the main body portion of the damping member is smaller than a diameter of the through-hole formed in the projecting portion.

4. An apparatus according to claim 1, wherein a projecting member which has a through-hole communicated with the through-hole of the holding member and is retained to the retaining portion of the damping member is formed on the surface of the holding member on the side opposite to the holding surface of the vibration generating source, and the damping member is retained to the vibration generating source through the projecting member.

5. An apparatus according to claim 4, wherein the diameter of the main body portion of the damping member is smaller than a diameter of the through-hole formed in the projecting member.

6. An apparatus according to claim 4, wherein the projecting member is exchangeably provided.

7. An apparatus according to claim 4, wherein a modulus of elasticity of the projecting member is different from a modulus of elasticity of the holding member.

8. An apparatus according to claim 1, wherein the fixing portion is brought into engagement with the portion of the damping member on the side of the vibration generating source from the retaining portion of the main body portion and allows the damping member to be brought into pressure contact with the vibration generating source and fixed.

9. An apparatus according to claim 1, wherein the vibration generating source is a fan.

* * * * *